O. CREPEAU.
RASP FOR CLOVER HULLERS AND THE LIKE.
APPLICATION FILED DEC. 13, 1913.
1,102,980.
Patented July 7, 1914.
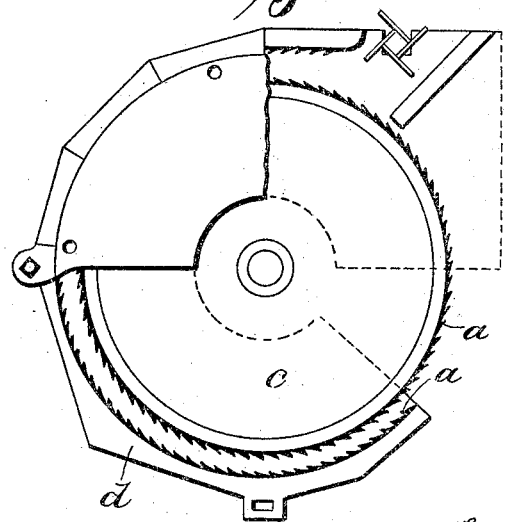
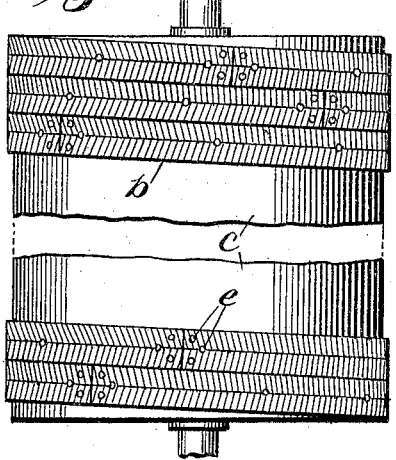
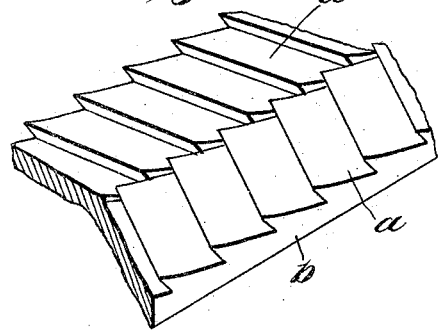
Witnesses
Inventor
Ovid Crepeau
Attorney

UNITED STATES PATENT OFFICE.

OVID CREPEAU, OF SOUTH BEND, INDIANA.

RASP FOR CLOVER-HULLERS AND THE LIKE.

1,102,980.  Specification of Letters Patent.  Patented July 7, 1914.

Application filed December 13, 1913. Serial No. 806,464.

*To all whom it may concern:*

Be it known that I, OVID CREPEAU, a citizen of the United States of America, residing at South Bend, in the county of St. Joseph and State of Indiana, have invented a certain new and useful Rasp for Clover-Hullers and the like, of which the following is a specification, reference being had therein to the accompanying drawing.

This invention relates to rasps for clover seed hullers and the like, the object of the invention being to produce a rasp for the purpose set forth, which will improve the character of work performed by the machine and at the same time materially increase the capacity and output of the machine.

In clover hulling machines, the heads, after being threshed off by the straw threshing cylinder, similar to the cylinder of a grain separator, are passed between the hulling cylinder and concave of the machine which is supposed to rub out the remainder of the seed. The pods which pass through the hulling cylinder and concave and are not hulled the first time, are returned to the cylinder a second time by the tailings elevator and subjected to a second operation of the same character.

With the old form of rasp now in common use, it is possible for the seed to pass through between the teeth and come out of the machine unhulled. With the new rasp, hereinafter fully described, the seed are practically all hulled on the first passage through the hulling cylinder, so that it is not necessary to return so large an amount of unhulled pods through the tailings elevator to the hulling machine the second time. This increases the capacity of the machine and also enables the seed to be separated from the pods with greater certainty.

The rasp of this invention has also proved very successful in hulling the seed of sweet clover which cannot be hulled to advantage by the ordinary form of rasp. It also operates successfully in hulling certain kinds of trefoil used as a forage plant in certain Southern States. It also hulls the ordinary clover and alfalfa seed with greater certainty and with fewer seed that are bruised, cut or injured.

The teeth of the rasp of this invention, by reason of their shape and arrangement enable the chaff to clear itself out of the spaces between the teeth automatically and also enable the workmen to apply the pieces or sections of the rasp to the cylinder and concave in a perfectly even curve on account of said teeth not extending at right angles to the length of the rasp sections.

With the above and other objects in view, the invention consists in the novel construction, combination and arrangement herein fully set forth, illustrated and claimed.

In the accompanying drawings:—Figure 1 is a sectional elevation of a portion of a clover seed huller embodying the present invention. Fig. 2 is a plan view of the cylinder showing the same partly covered with rasp sections embodying this invention. Fig. 3 is a perspective view of a fragment of one of the rasp sections clearly illustrating the character of the rasp surface. Fig. 4 is a longitudinal section through the same. Fig. 5 is a plan view of a fragment of one of the rasp sections.

Prior to my invention, grinding mills and machines for grinding clay have been designed embodying grinding surfaces employing teeth or corrugations arranged in parallel rows with the adjacent extremities of the said teeth abutting and registering. Such arrangement in a hulling machine would not provide for the necessary clearance of the teeth and would result in a congestion of the chaff between the teeth so as to render the hulling surface ineffective. It has also been proposed in corn shellers and grinding mills to provide the working faces of the grinding members with parallel rows of teeth reversely oblique to each other with their adjacent extremities in transverse alinement with each other but separated so as to leave an intervening channel. Such a channel, however, in a hulling machine would permit a great quantity of the seed to escape without being hulled, requiring one or more subsequent operations of the same kind on the same material. This arrangement would impair the work of the machine and result in an unsatisfactory product and much waste.

In crushers and pulverizers teeth have been provided in parallel rows, the teeth of one row being staggered with relation to those of the adjacent row, the said teeth also overlapping each other at their adjacent extremities. In a hulling machine, such an arrangement of teeth would too greatly retard the forward movement of the material and furthermore the wedge shaped contracting spaces between the overlapping portions of said teeth would speedily result in a congestion of the material in such wedge shaped spaces or pockets.

The rasp contemplated in this invention embodies parallel rows or series of teeth which are chisel shaped, said teeth being indicated at *a*, in the accompanying drawings. Said teeth all extend diagonally or obliquely with respect to the general direction of movement of the material being acted upon thereby, and the teeth of one row are reversely oblique to the teeth of the adjacent row, as best illustrated in Figs. 3 and 5. The adjacent extremities of the teeth of parallel rows or series are also staggered with relation to each other as clearly shown in Fig. 5, and the said inner extremities of the teeth terminate in a plane coincident with the line of division between the rows and intersect said line without crossing or overlapping the same.

As the result of the construction and arrangement of teeth above set forth no channels are left throughout the entire area of the rasp surface extending in the general direction of movement of the material and therefore all of the material is evenly and uniformly acted upon by the hulling teeth.

The rasp surface as a whole is made up of a suitable number or sections or strips *b* which are bent around the cylinder *c* and the working face of the concave *d* as indicated in the drawings and secured in place by suitable fasteners *e*. The rasp sections or strips *b* are shown as extending spirally of the cylinder. The form of said sections or strips and the arrangement of the teeth as herein described admits of the application of said sections to the cylinder and concave as just stated.

I claim:—

1. A rasp for clover seed hullers and the like, embodying parallel rows of straight edged chisel shaped hulling teeth the working edges of which are oblique to the general direction of movement of the seed, the teeth of one row being reversely oblique to those of the adjacent row, and the adjacent extremities of the teeth of said rows being staggered with relation to each other and terminating in a plane coincident with the line of division between the rows and intersecting said line without overlapping the same.

2. The combination with the cylinder of a clover seed huller or like machine, of a rasp consisting of a strip embodying parallel rows of straight edged chisel shaped hulling teeth the working edges of which are oblique to the general direction of movement of the seed, the teeth of one row being reversely oblique to those of the adjacent row, and the adjacent extremities of the teeth of said rows being staggered with relation to each other and terminating in a plane coincident with the line of division between the rows and intersecting said line without overlapping the same, said strip extending spirally of the cylinder and the intersection line of the teeth also extending spirally of the cylinder.

In testimony whereof I affix my signature in presence of witnesses.

OVID CREPEAU.

Witnesses:
J. B. BAKER,
F. E. BIRESEE,
M. A. WINGARD.